(12) United States Patent
Ohsaki et al.

(10) Patent No.: US 7,503,060 B2
(45) Date of Patent: Mar. 10, 2009

(54) REACTIVE SYSTEM SAFETY VERIFICATION DEVICE, METHOD, PROGRAM, AND RECORDING MEDIUM CONTAINING THE PROGRAM

(75) Inventors: Hitoshi Ohsaki, Hyogo (JP); Toshinori Takai, Hyogo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 335 days.

(21) Appl. No.: 10/521,671

(22) PCT Filed: Jul. 18, 2003

(86) PCT No.: PCT/JP03/09155

§ 371 (c)(1), (2), (4) Date: Sep. 15, 2005

(87) PCT Pub. No.: WO2004/010639

PCT Pub. Date: Jan. 29, 2004

(65) Prior Publication Data

US 2006/0107305 A1   May 18, 2006

(30) Foreign Application Priority Data

Jul. 19, 2002   (JP)   ............................. 2002-211021

(51) Int. Cl.
*G06F 17/00*   (2006.01)
*H04L 9/00*   (2006.01)
*H04L 9/30*   (2006.01)

(52) U.S. Cl. ...................... 726/1; 726/2; 726/3; 726/4; 726/5; 726/6; 713/168; 713/169; 713/170; 713/171; 713/172; 380/28

(58) Field of Classification Search ................ 713/168; 726/1
See application file for complete search history.

(56) References Cited

OTHER PUBLICATIONS

"Abstract Cryptogrpahic Protocols with Tree Automata" (Computer Science Lab, David Monniaux, Jun. 1999).*
Hitoshi Ohsaki et al., "Decidability and Closure Properties of Equational Tree Languages", Rewriting Techniques and Applications 13th International Conference, RTA 2002 Proceedings (Lecture Notes in Computer Science vol. 2378) Springer-Verlag Berlin, Germany (2002), pp. 114-128.
Hitoshi Ohsaki, "Beyond Regularity: Equational Tree Automata for Associative and Commutative Theories", Computer Science Logic 15th International Workshop, CSL 2001 10th Annual Conference of the EACSL. Proceedings (Lecture Notes in Computer Science vol. 2142) Springer-Verlag Berlin, Germany (2001), pp. 539-553.

(Continued)

*Primary Examiner*—Longbit Chai
(74) *Attorney, Agent, or Firm*—Knobbe Martens Olson & Bear LLP

(57) ABSTRACT

A safety verification device of a reactive system, in which a set of axioms consists only of a commutative law and an associative law, comprises a translation unit (8) which generates, under said set of axioms, a first equational tree automaton which accepts a set of terms; a simulation unit (9) which generates, under a set of rewriting rules and said set of axioms and using said first equational tree automaton as initial data, a second equational tree automaton which accepts said set of terms and a set of terms derived from said set of terms; and a set operation unit (10) which generates a fourth equational tree automaton by associating said second equational tree automaton with a third equational tree automaton which accepts a set of terms to be verified, and determines whether or not a set accepted by the fourth equational tree automaton is an empty set.

12 Claims, 5 Drawing Sheets

| Set | Transition rule | Condition |
|---|---|---|
| $\mathcal{R}_\times$ | $f((p_1, q_1), \ldots, (p_n, q_n)) \to (p, q)$ | $\forall f \in \mathcal{F} \setminus \mathcal{G}$<br>$\forall f(p_1, \ldots, p_n) \to p \in \mathcal{R}_A$<br>$\forall f(q_1, \ldots, q_n) \to q \in \mathcal{R}_B$ |
| $\mathcal{R}_{\overline{A}}$ | $g((p_1, q_1), (p_2, q_2)) \to g((p, q_1), q_2)$<br>$g(p_1, (p_2, q_2)) \to (p, q_2)$ | $\forall g \in \mathcal{G}$<br>$\forall q_1, q_2 \in \mathcal{Q}_B$<br>$\forall g(p_1, p_2) \to p \in \mathcal{R}_A$ |
| | $g((p_1, q_1), (p_2, q_2)) \to g((r_1, q_1), (r_2, q_2))$<br>$g(p_1, (p_2, q_2)) \to g(r_1, (r_2, q_2))$ | $\forall g(p_1, p_2) \to g(r_1, r_2) \in \mathcal{R}_A$ |
| $\mathcal{R}_{\overline{B}}$ | $g((p_1, q_1), (p_2, q_2)) \to g((p_1, q), p_2)$<br>$g(q_1, (p_2, q_2)) \to (p_2, q)$ | $\forall g \in \mathcal{G}$<br>$\forall p_1, p_2 \in \mathcal{Q}_A$<br>$\forall g(q_1, q_2) \to q \in \mathcal{R}_B$ |
| | $g((p_1, q_1), (p_2, q_2)) \to g((p_1, r_1), (p_2, r_2))$<br>$g(q_1, (p_2, q_2)) \to g(r_1, (p_2, r_2))$ | $\forall g(q_1, q_2) \to g(r_1, r_2) \in \mathcal{R}_B$ |
| $\mathcal{R}_\mathcal{G}$ | $g((p, q_1), q_2) \to g(q_1, (p, q_2))$<br>$g((p_1, q), p_2) \to g(p_1, (p_2, q))$<br>$g(q, p) \to (p, q)$ | $\forall g \in \mathcal{G}$<br>$\forall p_1, p_2, p \in \mathcal{Q}_A$<br>$\forall q_1, q_2, q \in \mathcal{Q}_B$ |

OTHER PUBLICATIONS

Yuichi Kaji et al., "Solving a Unification Problem under Constrained Substitutions Using Tree Automata", Journal of Symbolic Computation Academic Press UK (1997) 23(1), pp. 79-117.

European Search Report issued by European Patent Office on Apr. 19, 2007.

Aart Middeldorp, Hitoshi Ohsaki and Hans Zantema, "Transforming Termination by Self-Labelling", In Proc. of 13th International Conference on Automated Deduction (CADE-13), New Brunswick (New Jersey), Jul. 1996. LNAI 1104, pp. 373-387.

David Monniaux, "Abstracting Cryptographic Protocols with Tree Automata", Proceeding of 6th International Static Analysis Symposium, Venice(Italy), Lecture Notes in Computer Science 1694, pp. 149-163, 1999.

Hitoshi Ohsaki, Aart Middeldorp and Tetsuo Ida, "Distribution Elimination by Semantic Labelling: Methods for Proving Termination of Term Rewriting Systems", Computer Software, vol. 13, No. 2, Mar. 15, 1996, pp. 58-73.

Kazuhiro Takada, Yuichi Kaji And Tadao Kasami, "Syntactic Unification Problems under Constrained Substitutions", IEICE Transactions on Information and Systems, vol. E80-D, No. 5, May 25, 1997, pp. 553-561.

Kouji Kitaoka, Toshinori Takai, Yuichi Kaji, Takehiko Tanaka and Hiroyuki Seki, "Finite Overlapping Term Rewriting Systems Effectively Preserve Recognizability", Technical Report of IEICE: COMP98-38-50, vol. 98, No. 380, Oct. 30, 1998, pp. 57-64.

Richard Mayr and Michael Rusinowitch, "Reachability is Decidable for Ground AC Rewrite Systems", Proceedings of 3rd International Workshop on Verification of Infinite State Systems, Aalborg (Denmark), 1998.

Rohit Parikh, "On Context-Free Languages", Journal of the ACM, vol. 13, No. 4, pp. 570-581, 1966.

Takehiko Tanaka, Yuichi Kaji, Hajime Watanabe, Toyoo Takata and Tadao Kasami, "Security Verification of Real-Time Cryptographic Protocols Using a Rewriting Approach", IEICE Transactions on Information and Systems, vol. E81-D, No. 4, Apr. 25, 1998, pp. 355-363.

Thomas Genet and Francis Klay, "Rewriting for Cryptographic Protocol Verification", Proceeding of 17th International Conference on Automated Deduction, Pittsburgh(PA), Lecture Notes in Computer Science 1831, pp. 271-290, 2000.

Yuichi Kaji, Toru Fujiwara and Tadao Kasami, "Solving a Unification Problem under Constrained Substitutions Using Tree Automata", Journal of Symbolic Computation (1997) 23(1), pp. 79-117.

* cited by examiner

Fig. 3

| | |
|---|---|
| Designate input/output argument | Input $l \to r$ : Rewriting rule<br>$\mathcal{A}/AC$ : Equational tree automaton<br>Output $\mathcal{B}_{l \to r}/AC$ : Equational tree automaton |
| Initial setting | $\mathcal{A}_0 := \mathcal{A};\ i := 0;\ j := 0;$<br>$S := \text{pos}(l);$<br>$T := \text{pos}(r);$ |
| First process | while $S \neq \varnothing$ do<br>  Select element p which satisfies the following condition from S : $\forall p' \in S.\ p \succeq p'$<br>  Calculate equational tree automaton $\mathcal{A}_{i+1}/AC$ which satisfies the following condition    : ··· (1)<br>    when $l_{|p} = f(t_1, \ldots, t_n)$<br>    $\mathcal{L}(\mathcal{A}_{i+1}/AC) = (\{\to_{\{f(c_{t_1}^{p \cdot 1}, \ldots, c_{t_n}^{p \cdot n}) \to c_{l_{|p}}^{p}\}/AC})[\mathcal{L}(\mathcal{A}_i/AC)]$<br>  $i := i + 1;$<br>  $S := S - \{p\};$<br>od<br>Calculate equational tree automaton $\mathcal{B}_0/AC$ which satisfies the following condition<br>  $\mathcal{L}(\mathcal{B}_0/AC) = (\{\to_{\{c_l^\epsilon \to d_r^\epsilon\}/AC})[\mathcal{L}(\mathcal{A}_i/AC)]$ |
| Second process | while $T \neq \varnothing$ do<br>  Select element q which satisfies the following condition from T : $\forall q' \in T.\ q' \succeq q$<br>  Calculate equational tree automaton $\mathcal{B}_{j+1}/AC$ which satisfies the following condition    : ··· (2)<br>    when $r_{|q} = f(t_1, \ldots, t_n)$<br>    $\mathcal{L}(\mathcal{B}_{j+1}/AC) = (\{\to_{\{d_{r_{|q}}^q \to f(d_{t_1}^{q \cdot 1}, \ldots, d_{t_n}^{q \cdot n})\}/AC})[\mathcal{L}(\mathcal{B}_j/AC)]$<br>  $j := j + 1;$<br>  $T := T - \{q\};$<br>od<br>$\mathcal{B}_{l \to r} := \mathcal{B}_j;$ |
| | return $\mathcal{B}_{l \to r}/AC$ |

Fig. 4

| Set | Transition rule | Condition |
|---|---|---|
| $\mathcal{R}_\times$ | $f((p_1,q_1),\ldots,(p_n,q_n)) \to (p,q)$ | $\forall f \in \mathcal{F} \setminus \mathcal{G}$<br>$\forall f(p_1,\ldots,p_n) \to p \in \mathcal{R}_A$<br>$\forall f(q_1,\ldots,q_n) \to q \in \mathcal{R}_B$ |
| $\mathcal{R}_{\overline{A}}$ | $g((p_1,q_1),(p_2,q_2)) \to g((p,q_1),q_2)$<br>$g(p_1,(p_2,q_2)) \to (p,q_2)$ | $\forall g \in \mathcal{G}$<br>$\forall q_1,q_2 \in \mathcal{Q}_B$<br>$\forall g(p_1,p_2) \to p \in \mathcal{R}_A$ |
| | $g((p_1,q_1),(p_2,q_2)) \to g((r_1,q_1),(r_2,q_2))$<br>$g(p_1,(p_2,q_2)) \to g(r_1,(r_2,q_2))$ | $\forall g(p_1,p_2) \to g(r_1,r_2) \in \mathcal{R}_A$ |
| $\mathcal{R}_{\overline{B}}$ | $g((p_1,q_1),(p_2,q_2)) \to g((p_1,q),p_2)$<br>$g(q_1,(p_2,q_2)) \to (p_2,q)$ | $\forall g \in \mathcal{G}$<br>$\forall p_1,p_2 \in \mathcal{Q}_A$<br>$\forall g(q_1,q_2) \to q \in \mathcal{R}_B$ |
| | $g((p_1,q_1),(p_2,q_2)) \to g((p_1,r_1),(p_2,r_2))$<br>$g(q_1,(p_2,q_2)) \to g(r_1,(p_2,r_2))$ | $\forall g(q_1,q_2) \to g(r_1,r_2) \in \mathcal{R}_B$ |
| $\mathcal{R}_\mathcal{G}$ | $g((p,q_1),q_2) \to g(q_1,(p,q_2))$<br>$g((p_1,q),p_2) \to g(p_1,(p_2,q))$<br>$g(q,p) \to (p,q)$ | $\forall g \in \mathcal{G}$<br>$\forall p_1,p_2,p \in \mathcal{Q}_A$<br>$\forall q_1,q_2,q \in \mathcal{Q}_B$ |

REACTIVE SYSTEM SAFETY VERIFICATION DEVICE, METHOD, PROGRAM, AND RECORDING MEDIUM CONTAINING THE PROGRAM

TECHNICAL FIELD

The present invention relates to a safety verification device, method and program of a reactive system based on tree automata theory, and a recording medium containing the program.

BACKGROUND ART

Recent advances in computer and communication technologies have been promoting exchange of a large amount of information via public networks and dedicated networks in various industrial fields. Such communication often needs to exchange confidential information. Particularly in the fields of the financial industry, electronic commerce, etc., certification between operators, confidentiality of communication information and the like are required with a high accuracy. A variety of methods for ensuring the safety, such as cryptographic processing, have been developed and used. The safety of a provided service, when the strictness of cryptography is guaranteed, mainly depends on the safety of the cipher communication procedure used (for example, the certainty that "a secret key" used to decrypt the encrypted information is received only by an intended person). Therefore, verifying the safety of a developed cipher communication procedure is a very important technique for ensuring the secrecy of confidential information.

In the present application, "cipher communication procedure" includes data encryption and decryption procedures, and a procedure in which encrypted data are exchanged via communication lines, but does not include implementing methods such as the bit format of datagrams established by communications standards or the dynamic control of communication channels.

Moreover, "safety verification" denotes checking not only cipher communication procedure but also checking an operational procedure of a reactive system that receives external stimuli during operation and responds to the stimuli repeatedly if it is described as intended. When the system will not be in any cases under unintended conditions, for example, dangerous conditions, the system is said to be "safe". A system communicating encrypted information is also a type of reactive systems, cipher communication procedures can be regarded as an operational procedure of the system. In safety verification of cipher communication procedures, the electrical reliability and quality of actual communication lines are not included in the targets to be verified, and safety means the security of the information to be exchanged.

Heretofore, a method using a framework called regular tree automata based on automata theory as a verification method of cipher communication procedures is known. A verification method proposed early is disclosed in "Solving a Unification Problem under Constrained Substitutions Using Tree Automata" (Journal of Symbolic Computation 23(1), pp. 79-117, 1997) by Y. Kaji, T. Fujiwara and T. Kasami.

A method developed from the above-mentioned method is disclosed in "Abstracting Cryptographic Protocols with Tree Automata" (Proceeding of 6th International Static Analysis Symposium, Venice (Italy), Lecture Notes in Computer Science 1694, pp. 149-163, 1999) by David Monniaux, and "Rewriting for Cryptographic Protocol Verification" (Proceeding of 17th International Conference on Automated Deduction, Pittsburgh (Pa.), Lecture Notes in Computer Science 1831, pp. 271-290, 2000) by Thomas Genet and Francis Klay.

An automaton is a system that abstractly represents an actual device, system, etc. It can be in a plurality of states, and transition between the states occurs in response to "an input". Possible states are not necessarily finite. When the automaton reached a predetermined final state from an initial state in response to one or a series of inputs INPUT, it is said that the INPUT is accepted by the automaton. In general, an automaton is written as $(\Sigma, Q, Qf, \Delta)$. Herein, $\Sigma$ is a set of inputs (symbols), $Q$ is a set of possible states, $Qf$ is a set of final states, and $\Delta$ is a set of transition rules.

Therefore, if an automaton which accepts only the elements of a certain set and rejects the other can be given, processing of the set, i.e., processing of the elements of the set can be equivalently performed by using the automaton. This is particularly effective when the set to be processed consists of infinite elements.

A tree automaton represents an automaton which accepts data having a tree structure. Moreover, regular tree automaton represents a tree automaton which satisfies regular conditions.

When an cipher communication procedure, one of the targets to be verified, is represented by a formal language, it has been necessary to satisfy regular conditions. For this reason, approaches using known automata theories (formal language techniques) have been unsuccessful to automatically verify cipher communication procedures that do not satisfy regular conditions.

Although the verification methods suggested in the above-mentioned three theses can perform approximate security verification of cipher communication procedures that do not satisfy regular conditions, they are disadvantageously unable to perform strict verification.

This problem occurs not only to cipher communication procedures, but also to the operational procedures of common reactive systems.

DISCLOSURE OF THE INVENTION

An object of the present invention is to provide a safety verification device, a verification method, a verification program and a computer-readable recording medium containing the program for reactive systems, which can verify the safety of the operational procedure of a reactive system that falls within the range of equational tree automata theory not approximately but accurately, regardless of whether or not it satisfies regular conditions. This object of the present invention can be achieved by the means described below.

Thus, according to a first aspect of the present invention, it is possible to provide a safety verification device of a reactive system represented by a set of function symbols, a set of rewriting rules, a set of axioms, a set of terms, and a set of terms to be verified, said set of axioms being a set consisting only of commutative laws and associative laws, and said safety verification device of a reactive system comprising: a translation unit generating, under said set of axioms, a first equational tree automaton which accepts said set of terms; a simulation unit generating, under said set of rewriting rules and said set of axioms and using said first equational tree automaton as initial data, a second equational tree automaton which accepts said set of terms and a set of terms derived from said set of terms; and, a set operation unit generating a fourth equational tree automaton by associating a third equational tree automaton which accepts said second equational tree automaton with said set of terms to be verified and determines whether or not a set accepted by the fourth equational tree automaton is an empty set.

According to a second aspect of the present invention, it is possible to provide a safety verification device of a reactive system represented by a set of function symbols, a set of rewriting rules, a set of axioms, a set of terms, and terms to be verified, said set of axioms being a set consisting only of a commutative law and an associative law, and said safety verification device comprising: a translation unit generating, under said set of axioms, a first equational tree automaton which accepts said set of terms; a simulation unit generating, under said set of rewriting rules and said set of axioms and using said first equational tree automaton as initial data, a second equational tree automaton which accepts said set of terms and a set of terms derived from said set of terms; and a set operation unit which determines whether or not said second equational tree automaton accepts said term to be verified.

According to a third aspect of the present invention, it is possible to provide a safety verification method of a reactive system represented by a set of function symbols, a set of rewriting rules, a set of axioms, a set of terms, and a set of terms to be verified, said set of axioms being a set consisting only a commutative law and an associative law, and said safety verification method comprising: a first step of generating, under said set of axioms, a first equational tree automaton which accepts said set of terms; a second step of generating, under said set of rewriting rules and said set of axioms and using said first equational tree automaton as initial data, a second equational tree automaton which accepts said set of terms and a set of terms derived from said set of terms; and a third step of generating a fourth equational tree automaton by associating said second equational tree automaton with a third equational tree automaton which accepts said set of terms to be verified, and determining whether or not a set accepted by the fourth equational tree automaton is an empty set.

According to a fourth aspect of the present invention, it is possible to provide a safety verification method of a reactive system represented by a set of function symbols, a set of rewriting rules, a set of axioms, a set of terms, and a term to be verified, said set of axioms being a set consisting only a commutative law and an associative law, and said safety verification method comprising: a first step of generating, under said set of axioms, a first equational tree automaton which accepts said set of terms; a second step of generating, under said set of rewriting rules and said set of axioms and using said first equational tree automaton as initial data, a second equational tree automaton which accepts said set of terms and a set of terms derived from said set of terms; and a third step of determining whether or not said second equational tree automaton accepts said term to be verified.

According to a fifth aspect of the present invention, it is possible to provide computer-readable recording medium containing a reactive system safety verification computer program comprising: a first program code which accepts an input of a procedure represented by a set of function symbols, a set of rewriting rules, a set of axioms, a set of terms, and a set of terms to be verified; a second program code which generates, under said set of axioms consisting only of a commutative law and an associative law, a first equational tree automaton which accepts said set of terms; a third program code which generates, under said set of rewriting rules and said set of axioms and using said first equational tree automaton as initial data, a second equational tree automaton which accepts said set of terms and a set of terms derived from said set of terms; and a fourth program code which generates a fourth equational tree automaton by associating said second equational tree automaton with a third equational tree automaton which accepts said set of terms to be verified, and determines whether or not a set accepted by the fourth equational tree automaton is an empty set.

According to a sixth aspect of the present invention, it is possible to provide a computer-readable recording medium containing a reactive system safety verification computer program, said program comprising: a first program code which accepts an input of a procedure represented by a set of function symbols, a set of rewriting rules, a set of axioms, a set of terms, and a term to be verified; a second program code which generates, under said set of axioms consisting only of a commutative law and an associative law, a first equational tree automaton which accepts said set of terms; a third program code which generates, under said set of rewriting rules and said set of axioms and using said first equational tree automaton as initial data, a second equational tree automaton which accepts said set of terms and a set of terms derived from said set of terms; and a fourth program code which determines whether or not said second equational tree automaton accepts said term to be verified.

According to a seventh aspect of the present invention, it is possible to provide a computer program data signal for reactive system safety verification embodied in a carrier wave, comprising: a first program code which accepts an input of a procedure represented by a set of function symbols, a set of rewriting rules, a set of axioms, a set of terms, and a set of terms to be verified; a second program code which generates, under said set of axioms consisting only of a commutative law and an associative law, a first equational tree automaton which accepts said set of terms; a third program code which generates, under said set of rewriting rules and said set of axioms and using said first equational tree automaton as initial data, a second equational tree automaton which accepts said set of terms and a set of terms derived from said set of terms; and a fourth program code which generates a fourth equational tree automaton by associating said second equational tree automaton with a third equational tree automaton which accepts said set of terms to be verified, and determines whether or not a set accepted by the fourth equational tree automaton is an empty set.

According to an eighth aspect of the present invention, it is possible to provide a computer program data signal for reactive system safety verification embodied in a carrier wave, comprising: a first program code which accepts an input of a procedure represented by a set of function symbols, a set of rewriting rules, a set of axioms, a set of terms, and a term to be verified; a second program code which generates, under said set of axioms consisting only of a commutative law and an associative law, a first equational tree automaton which accepts said set of terms; a third program code which generates, under said set of rewriting rules and said set of axioms and using said first equational tree automaton as initial data, a second equational tree automaton which accepts said set of terms and a set of terms derived from said set of terms; and a fourth program code which determines whether or not said second equational tree automaton accepts said term to be verified.

In said first to eighth aspects, said set of function symbols can be a set comprising function symbols representing encryption, decryption, and communication processing as its elements; said set of rewriting rules can be a set comprising as elements rules representing that encrypted information is returned to plaintext by decryption; said term to be verified can be confidential information; said set of terms can be a set of knowledge of each of subjects that exchanges confidential information, and a set of knowledge of a subject that monitors the information exchanged between said subjects.

BRIEF DESCRIPTION OF THE DRAWINGS

FIG. 3 is an illustrative drawing showing the algorithm of the process of calculating an equational tree automaton which accepts an extended set of knowledge by a safety verification device of a reactive system according to an embodiment of the present invention.

FIG. 4 is an illustrative drawing showing association processing of two automata.

BEST MODE FOR CARRYING OUT THE INVENTION

Figure 1:
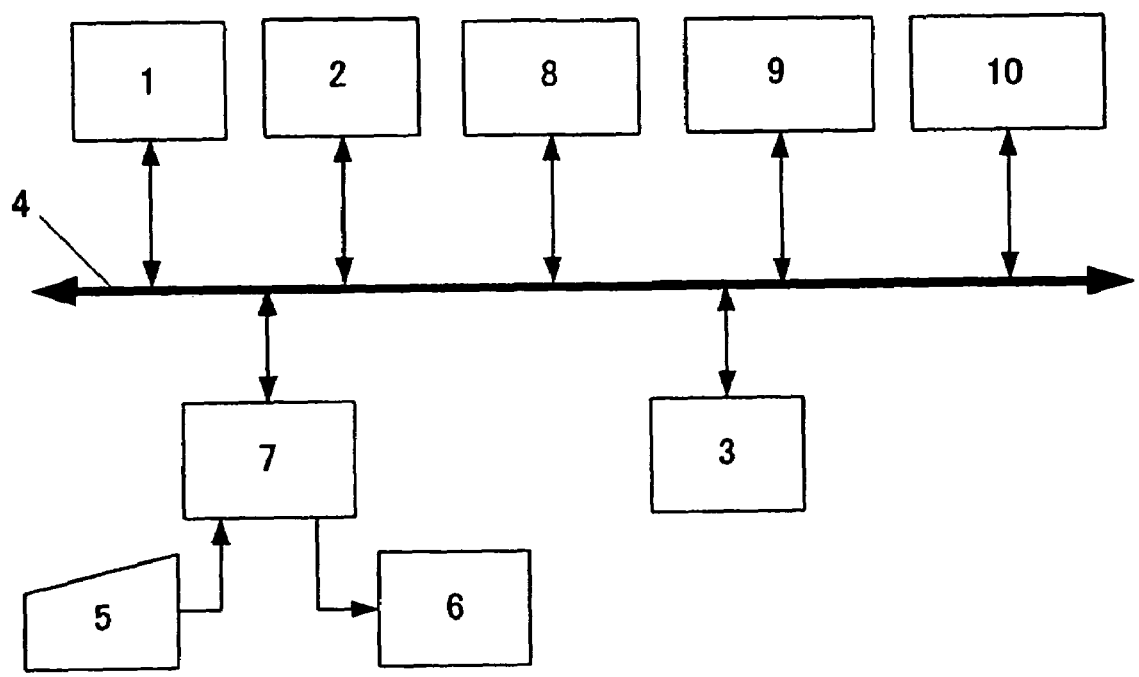
FIG. 1 is a block diagram showing the schematic construction of a safety verification device of a reactive system according to an embodiment of the present invention.

Below, embodiments of the present invention will be described with referring to the accompanying drawing. FIG. 1 is a block diagram showing the construction of a safety verification device of a reactive system according to an embodiment of the present invention. The safety verification device of a reactive system according to this embodiment comprises a central processing unit (hereinafter referred to as CPU) 1 that controls the units constructing the system, a temporary memory unit (hereinafter referred to as memory) 2 that stores data temporarily, a recording unit 3 that stores data continuously, an internal bus 4 for exchanging data between units, an input unit 5 that receives data inputs, a display unit 6 that displays results of processing and the like, an interface unit 7, a translation unit 8, a simulation unit 9, and a set operation unit 10.

CPU 1 controls the units constructing the system, and the translation unit 8, simulation unit 9, and set operation unit 10 perform key processing in safety verification in response to an instruction from the CPU 1, as described later. The information relating to the operational procedure, which is a target to be verified, is input from the input unit 5, is converted to a predetermined data format by the interface unit 7, and recorded in the recording unit 3. In the data processing described later, required data is read from the recording unit 3 by the memory 2, processing is performed on the memory 2. The results of processing is recorded by the recording unit 3 and displayed on the display unit 6, if so required.

Figure 2:
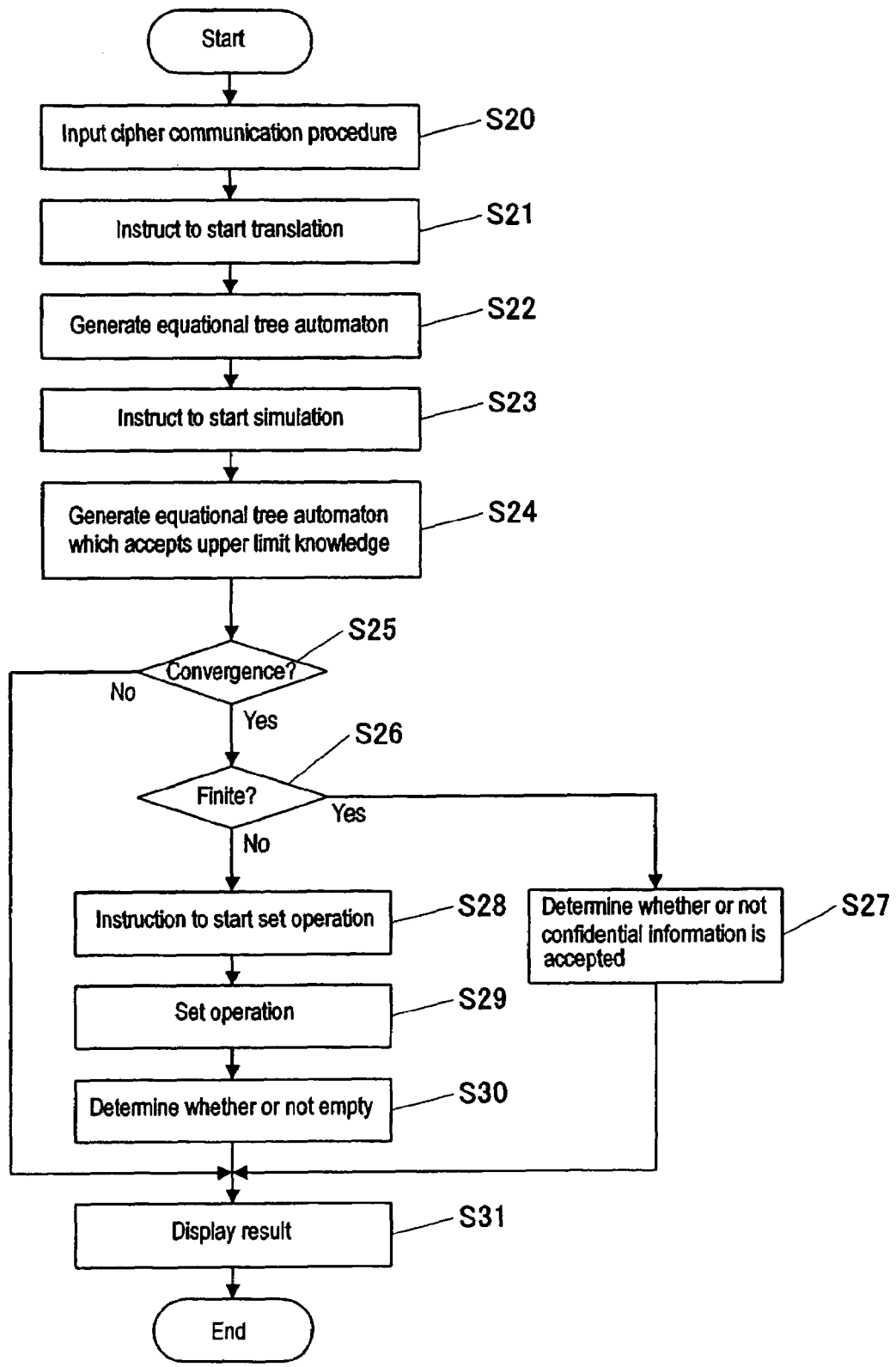
FIG. 2 is a flowchart showing the processes performed by a safety verification device of a reactive system according to an embodiment of the present invention.

FIG. 2 is a flowchart showing the processing of the safety verification device of a reactive system according to this embodiment, with respect to an cipher communication procedure. Before describing how the verification device performs according to FIGS. 1 and 2, a method of describing an cipher communication procedure, which is one of the targets to be verified, will be described.

The processing targeting a set consisting of finite elements can be performed to each element by directly describing the element, but the cipher communication procedure to be verified in the present invention cannot be described as a set consisting of finite elements in general. Therefore, a target to be verified is represented by a "system" described with a set of possible states, and inputs that trigger transition from one state to another, that is, automata.

More specifically, the cipher communication procedure to be verified is represented by the group of 5 symbols shown in formula 1 below. This also means that "communication procedure" that can be represented by the symbolic expression of formula 1 only can be the target to be verified. Below, the symbols { } represent a set. For example, {Li} represents a set consisting of L1, L2, L3, etc.

$$P=(F,\{Ri\},U,\{Ki\},S[j \to k])$$ (formula 1)

Herein, P represents an cipher communication procedure; i satisfies, when m is a natural number, $1 \leq i \leq m$; and j and k are positive integers that are not higher than m.

F, Ri, U, Ki and S[j→k] each represents a set. F represents a set of "function symbols" that represent encryption, decryption, communication processing (key exchange, message exchange, etc.), communication data (message, password, etc.), etc.; Ri (i=1–m) represents a set of "rewriting rules"; U represents a set of "axioms"; and Ki (i=1–m) represents a set of "terms" (for example, when there are 3 subjects relating to information exchange, A, B and C, K1, K2 and K3 are set correspondingly). Herein, a "term" means an element included in a set, and is represented by a single symbol or combinations of symbols. S[j→k] represents a set of messages (hereinafter referred to as a set of terms to be verified) which the subject having Kj wants to conceal from the subject having Kk.

The set of axioms U consists of a commutative law and an associative law. It can be written as, when the operator for terms x and y is "+", Commutative law: x+y=y+x Associative law: (x+y)+z=x+(y+z).

Herein, "+" is not a symbol representing addition.

The set Ki represents, a plurality of subjects exchanging encrypted information and a set of knowledge that can be obtained by each communication monitor. For example, when the subjects A and B interchange encrypted information, the knowledge of the subjects A and B are represented by K1 and K2, respectively, and the knowledge of a monitor C is represented by K3. Knowledge is a set of finite number of terms in the initial state, but, in general, is extend over time. For example, the knowledge K3 of the monitor C is increased as the monitor C monitors encrypted information that is repeatedly exchanged between the subjects A and B.

A rewriting rule {Ri} is a rule determining how a description that has applied a function symbol to a term is rewritten to a different description. For example, when encryption is E, decryption is D, a key is x, and a plaintext message is y, the characteristic that "decrypting an encrypted message with its code key generates the original plaintext message" is represented by the rewriting rule "D(x,E(x,y))→y", in which the arrow shows that the term at the left of the arrow can be rewritten with the term at the right.

Below, according to FIG. 2, with respect to the cipher communication procedure, the processing performed by the safety verification device of a reactive system according to this embodiment will be described.

First, in step 20, the CPU 1 receives information relating to a procedure to be verified, i.e., an input of the expression (F,{Ri},U,{Ki},S[j→k]) by the above symbols via the input unit 5, and records the obtained input data in the recording unit 3. At this time, when the set of terms S[j→k] to be verified is an infinite set, the description of the automaton which accepts the set is input. The obtained data is a logical expression using logic symbols. For example, it is input in text data format, and is processed in the same text format in the following processes.

In step 21, the CPU 1 reads out the data recorded in the recording unit 3 in step 20 from the recording unit 3 to a predetermined area on the memory 2, and transmit an operation code to start translation and the memory address information of necessary data to the translation unit 8.

In step 22, the translation unit 8, which has received the operation code, obtains knowledge {Ki} and axiom U from the memory 2 based on the memory address information, and generates an equational tree automaton Ai by using the knowledge Ki and axiom U. The generated equational tree automaton Ai is recorded in the predetermined area of the memory 2 via the CPU 1.

Methods of generating the automaton Ai which accepts the terms of the knowledge Ki are published in "Solving a Unification Problem under Constrained Substitution using Tree Automata" (Journal of Symbolic Computation 23(1), pp. 79-117, 1997) by Y. Kaji, T. Fujiwara, T. Kasami and other publications. Therefore, they are easy for a person having normal knowledge in this field and will not be described herein.

Each Ai outputted by the translation unit 8 is, under the axiom U, an equational tree automaton which accepts the knowledge Ki, which is a corresponding set. Herein, as described above, an automaton is a system represented by possible states and transition from one state to another in response to an input, and a tree automaton is an automaton which accepts data (term) having a tree structure.

Moreover, "equational" means that an axiom representing an equivalent concept holds between data having a tree structure. For example, in order to equate the term "1+2" with the term "2+1", the axiom "x+y=y+x" is required. Likewise, in order to equate the term "(1+2)+3" with the term "3+(2+1)", assuming x+y=y+x is sufficient. The axiom "(x+y)+z=x+(y+z)" is needed, for example, when the term "(1+2)+3" is equated with the term "1+(2+3)". Herein, "+" does not mean addition but is an operator. Thus, "an equational tree automaton" is an automaton that determines to accept or not to accept tree-structure data, on the assumption that an equivalent axiom holds between the data having a tree structure.

Moreover, the phase "to accept a set" means to accept only the elements of the set, that is, to accept all the elements (terms) of the set and not to accept the other.

From the foregoing, each automaton Ai is described as an equational tree automaton accepting a knowledge Ki in which each term has a tree structure and the equivalent axiom U holds between the terms.

As mentioned above, in step 22, the translation unit 8 converts the incipient knowledge Ki of each subject to the equational tree automaton Ai, in other words, describes as the equational tree automaton Ai which accepts the set Ki. This allows the processes relating to the set Ki to be handled as those relating to the equational tree automaton Ai equivalent to the set.

In step 23, the CPU 1 transmits an operation code to start simulation to the simulation unit 9, together with the address information on the memory 2 in which the equational tree automaton {Ai} generated by the translation unit 8, knowledge {Ki} and axiom U are recorded.

In step 24, having received the start instruction from the CPU 1, the simulation unit 9 obtains the equational tree automaton {Ai}, knowledge {Ki} and axiom U from the memory 2 based on the received memory address information, and performs a predetermined process.

That is, the simulation unit 9 generates the equational tree automaton which accepts extended knowledge by repeatedly processing, using the equational tree automaton {Ai} read out from the memory 2 as initial data. When the simulation unit 9 decides that predetermined convergence condition is satisfied in the course of processing, for example, when it decides that the equational tree automaton has stopped changing as a result of the repeated processing, it outputs the equational tree automaton {Ai*} at that point, and transmits it to the CPU 1 together with a convergence code that notifies the convergence. The CPU 1 records these calculated data received from the simulation unit 9 in a predetermined area on the memory 2.

FIG. 3 is a drawing that shows the algorithm of the subroutine called by the repeated processing in the generation of the above equational tree automaton {Ai*}. This algorithm comprises designating input/output arguments, initial setting, a first process and a second process. The input arguments are one element (l→r) of the rewriting rules and an equational tree automaton (A/AC). The output argument is an equational tree automaton ($B_{l \to r}$/AC) of the calculation results.

In the initial setting, as an initial value for the following processes, the value of the input argument, tree automaton A, is set to A0, and sets S and T are set. The sets S and T have position information as their elements when the terms of the left-hand side (corresponding to l) and right-hand side (corresponding to r) of the rewriting rule l→r, which is the value of the input argument, are described in a tree structure.

In the first process, transition rules are added and modified in a predetermined order based on the elements of the set S. In the second process, transition rules are added and modified by processing in a predetermined order based on the elements of the set T. Since the first and second processes are calculated on the same principle, only the case of the first process will be described.

In the first process, first, an element p that satisfies a predetermined condition is selected from a set S. On this condition, the element p is positioned at the end of the tree structure.

Second, when the function symbol of the element p in question is $f$, the terms of its argument part are $T_1, \ldots, T_N$, the term of the part corresponding to the element p can be written as $f(t_1, \ldots, t_n)$, all the terms included in $L(A_i/AC)$ are rewritten according to the rewriting rule below, obtaining a set of terms $L(A_{i+1}/AC)$.

Rewriting rule: $f(C^{p.1}_{t1}, \ldots, C^{p.n}_{tn}) \to C^p_{l/p}$

When $f$ is a function symbol used for the axiom, a set of terms $L(A_{i+1}/AC)$ can be calculated by a method that is Rohit Parikh technique extended for tree-structure data. When $f$ is not a function symbol used for the axiom, $A_{i+1}$ can be calculated on the basis of $A_i$ by the method introduced in the above described document by Y. Kaji et at, i.e., "Solving a Unification Problem under Constrained Substitutions Using Tree Automata" (Journal of Symbolic Computation 23 (1). pp. 79-117, 1997)." Thereafter, calculation is performed until the repetition condition is satisfied so that the pretreatment of the terms that match the left-hand side (corresponding to l) of the rewriting rule is completed and the next process is executed.

With regard to the second process, an element q that satisfies a predetermined condition is selected from a set T and processed similarly, whereby the loop calculation of the second process satisfies the repetition condition and the equational tree automaton $B_l$/AC is obtained. This is turned into $B_{l \to r}$/AC, which completes the second process. $B_{l \to r}$/AC is thus obtained, and is used as the value of the output argument.

As described above, the processing herein uses a method which has been developed from the technique using mapping from a character string space to a vector space by Rohit Parikha, so as to be able to handle tree-structure data. This method suggested by Parikh is disclosed in "On Context-Free Languages" (Journal of the ACM 13(4), pp. 570-581, 1966), which will be not fully described herein.

For each elements of the rewriting rules, the above processing is performed once with the equational tree automaton Ai as the input argument A/AC, and the results are collected, thus the equational tree automaton Ai*(1), which accepts knowledge extended corresponding to one process, is obtained. Using the obtained equational tree automaton Ai*(1) as the input argument A/AC, and processing similarly again, an equational tree automaton Ai*(2), which accepts knowledge extended corresponding to two processes, is obtained. By repeating this processing, equational tree automata Ai*(n), which accept knowledge extended one after another, can be obtained.

The simulation unit, as described above, determines convergence depending on whether or not the equational tree automaton Ai*(n) has been changed from the equational tree automaton Ai*(n-1) at one process before. When the unit determines that it has converged, Ai*(n) is, under the condition of the axiom U and rewriting rule Ri, the equational tree automaton Ai* which accepts incipient knowledge Ki and the set consisting of all the terms derived from incipient knowledge Ki.

While exchanging of encrypted information by subjects gradually increases the knowledge {Ki} of each subject and monitor, the simulation unit 9 describes the largest reachable knowledge {Ki} under predetermined conditions (axiom U and rewriting rule {Ri}) as the equational tree automaton {Ai*}, in step 24. This corresponds to establishing the boundary of an infinite set and is enabled by describing as an equational tree automaton.

When the simulation unit 9 is not determined to have converged after a predetermined time has passed or a predetermined number of repeated processes have been done, it transmits a non-convergence code that notifies that it did not converge to the CPU 1, and terminates the process. This means that the verification of that cipher communication procedure is impossible.

In step 25, the CPU 1 determines whether or not the code received from the simulation unit 9 is a convergence code. If it is determined to be a convergence code, it proceeds to step 26. If it is determined to be a non-convergence code, it proceeds to step 31.

In step 26, the CPU 1 determines whether or not a set of terms S[j→k] to be verified is a finite set. If it is determined to be a finite set, it proceeds to step 27, and if not, it proceeds to step 28. As explained in step 20, when the set of terms S[j→k] to be verified is not a finite set, the description of an equational tree automaton which accepts the set of terms S[j→k] to be verified is inputted.

When confidential information is finite, in step 27, the operation unit reads out the equational tree automaton A3* that represents the largest knowledge of a monitor C, and a set of terms S[j→k] to be verified, for example, S[1→3] from the memory 2, determines whether or not each element is accepted by the equational tree automaton A3*, and records the data depending on the results in a predetermined area on the memory 2. At this time, when no element of the set of terms S[1→3] to be verified is accepted by the equational tree automaton A3*, recorded data is "0". When at least one of the elements is accepted by the equational tree automaton A3*, recorded data is "1".

When a set of terms S[j→k] to be verified is not a finite set, in step 28, the CPU 1 sends a start instruction and necessary memory address information to the set operation unit 10.

In step 29, the set operation unit 10 obtains, from the memory 2, the equational tree automaton A3* representing the largest possible knowledge of the monitor C based on the memory address information received from the CPU 1, and an equational tree automaton S[j→k] which accepts a set of terms to be verified, for example, an equational tree automaton S[1→3] which accepts a set of terms to be verified for the monitor C from the subject A, and synthesizes A3* and S[1→3] to generate an equational tree automaton W. This synthesis corresponds to determining the product (A3*∩S[1→3]) of the two sets (A3* and S[1→3]) accepted by each automaton. Specifically, the common subset of the two sets (A3*∩S[1→3]) is accepted by the equational tree automaton W.

FIG. 4 is a drawing that illustrates an example of methods of synthesizing two tree automats. The transition rule of the automaton generated by associating two automata (A/AC, B/AC) which accepts the sets with which associative laws and commutative laws hold will be the 4 types of Rx-Rg shown in FIG. 4 combined together. The details are disclosed in the published literature "Beyond Regularity:Equational Tree Automata for Associative and Commutative Theories" (Proceedings of 15th International Conference of the European Association for Computer Science Logic, Paris (France), Lecture Notes in Computer Science 2142, pp. 539-553, 2001.) written by the inventors of the present invention, which will thus not be described herein.

In step 30, the set operation unit 10 determines whether or not the set A3*∩S[1→3] accepted by the equational tree automaton W obtained in step 29 is empty (having no elements). When the set operation unit 10 determines that it is an empty set, it transmits an empty code to the CPU 1, and if not, it transmits a nonempty code to the CPU 1.

Determining whether or not empty is performed by determining whether or not it is reachable from the final state q of the equational tree automaton B/AC which accepts the whole terms to the final state p of the equational tree automaton A/AC to be determined. More specifically, the left-hand side and right-hand side of a transition rule of a tree automaton B are interchanged, and the thus-obtained tree automaton is written as $B^{-1}$. When $(A \cup B^{-1})/AC$ is regarded as a ground AC rewrite system, the reachability from state q to state p will be equivalent to that the equational tree automaton A/AC accepts any element.

A specific method of calculating the path to access the final state p from the final state q is disclosed in "Reachability is Decidable for Ground AC Rewrite Systems" (Proceedings of 3rd International Workshop on Verification of Infinite State Systems, Aalborg (Denmark), 1998) by Richard Mayr and Michael Rusinowitch. Therefore, it is not be described herein.

In step 31, the CPU 1 displays on the display unit 6 according to the results of processing in the above-mentioned steps. Specifically, when the CPU 1 receives the non-convergence code (step 25), it displays that verification of the subject cipher communication procedure is infeasible. When the CPU 1, when the data recorded in the memory 2 as a result of the processing in step S27 is "0" (meaning nonacceptance), displays that the procedure is safe as long as the cipher communication procedure to be verified communicates the unaccepted confidential information, while when the data is "1" (meaning acceptance), it displays that the cipher communication procedure to be verified is not safe. When the CPU 1 receives an empty code, as a result of processing in step 30, it displays that the cipher communication procedure to be verified is safe, while when it receives a nonempty code, it displays that the cipher communication procedure to be verified is not safe. After these processes, the CPU 1 records, if so required, the data temporarily recorded on the memory 2 in the recording unit 3, and terminates the safety verification of cipher communication procedure. The function of the above translation unit 8, simulation unit 9 and set operation unit 10 may be realized by software. Specifically, a computer program code for the CPU 1 may be generated and the CPU 1 may execute the computer program so that the CPU 1 executes part or all of the above-described processing of the translation unit 8, simulation unit 9 and set operation unit 10.

Below, the application of the present invention to an cipher communication procedure will be described specifically.

EXAMPLE 1

The case where the present invention is applied to a Diffie-Hellman cipher communication procedure will be described. A Diffie-Hellman cipher communication procedure is an cipher communication procedure in which, when encrypted communication is performed between subjects A and B, two types of keys, i.e., a secret key and a public key, are generated as keys for encryption/decryption according to a predetermined rule, and the public key is exchanged between the subjects A and B, for example, via public networks.

In Diffie-Hellman cipher communication procedure, the subject A generates a public key X by formula 2 below on the basis of a large positive integer x selected in an arbitrary manner, and communicates X to the subject B. The subject B generates a public key Y by formula 3 below on the basis of a large positive integer y selected in an arbitrary manner, and communicates Y to the subject A.

$$X = g^x \bmod n \quad \text{(formula 2)}$$

$$Y = g^y \bmod n \quad \text{(formula 3)}$$

Herein, g and n represent arbitrary large prime numbers, and "mod" represents a remainder. For example, a mod b represents the remainder of the division of a by b.

The subject A is capable of calculating k by formula 4 below using Y obtained from the subject B and x selected by itself, and the subject B is capable of calculating k' by formula 5 below using X obtained from the subject A and y selected by itself.

$$k = Y^x \bmod n \quad \text{(formula 4)}$$

$$k' = X^y \bmod n \quad \text{(formula 5)}$$

Since the calculation results, k and k', are both equal to $g^{xy}$ mod n, the subjects A and B can obtain a common value, which is very difficult to obtain from g, n, X and Y exchanged between the subjects A and B unless x or y is known. Therefore, the subjects A and B will be able to safely exchange confidential data by using k(=k') as the key for encryption/decryption.

There are other variations of Diffie-Hellman cipher communication procedure than the above, all of which can be written as below. A message M is encrypted in Diffie-Hellman cipher communication procedure and exchanged by the subjects A and B; the monitor is represented by C; and the "behavior" which Diffie-Hellman cipher communication procedures have in common is represented by "+".

An cipher communication procedure P can be written as:

$$P = (F, \{Ri\}, U, \{Ki\}, S[1 \rightarrow 3])$$

in which i=1-3, and each symbol has the same meaning as in formula 1.

A set of function symbols F is:

$$F = \{A(0), B(0), C(0), N(0), M(0), k(1), +(2), E(2), D(2)\}$$

in which A and B are the subjects that exchange encrypted information; C is a monitor; N is an arbitrary natural number; M is the confidential information (for example, the information that is known only by the subject A at an early stage, then encrypted and transferred to the subject B) exchanged after being encrypted; k is a key, E is encryption; and D is decryption. As described above, "+" is not a symbol that represents addition, but a symbol representing the "behavior" that Diffie-Hellman cipher communication procedures have in common. The numbers in brackets are the argument of each symbol, i.e., the number of "variables" necessary to determine. Therefore, A(0), B(0), C(0), N(0) and M(0) are each a predetermined symbol or a numerical value. Variables are not required to determine these values. k(1) requires one variable to be determined, while E, D and + require two variables each. For example, k(1) is determined as k(A) or k(B) by determining either the subjects A or B. E is determined by keys and terms to be encrypted. D is determined by keys and terms to be decrypted. + is determined by the arguments of mod function, i.e., the divisor and dividend.

The rewriting rule (Ri) is:

$$R1 = R2 = R3 = \{D(x, E(x,y)) \rightarrow y\}$$

This shows that y can be obtained by decrypting the result of encryption y, namely E(x,y).

The axiom U is $$U = \{x+y=y+x, (x+y)+z=x+(y+z)\}$$

in which "+" does not represent addition but the "behavior" that Diffie-Hellman cipher communication procedures have in common. Specifically, it shows that the "behavior" that Diffie-Hellman cipher communication procedures have in common satisfies the commutative law and associative law.

Knowledge {Ki} is:

$$K1 = \{A, B, k(A)+k(B)+N, k(A), N, M\}$$

$$K2 = \{A, B, k(A)+k(B)+N, k(B), N, E(k(A)+k(B)+N, M)\}$$

$$K3 = \{A, B, C, k(A)+N, k(B)+N, k(C), N, E(k(A)+k(B)+N, M)\}$$

K1-K3 are the knowledge of the subjects A-C, respectively. Since N, k(A)+N, k(B)+N for the information of the keys, and a encrypted message E(k(A)+k(B)+N,M) are exchanged between the subjects A and B, the knowledge K3 of monitor C includes those information. In the knowledge K3 of the monitor C, there are expressions k(A)+N and k(B)+N, each of which are exchanged as one piece of information in the cipher communication between the subjects A and B. Therefore, it is possible for the monitor C to obtain k(A)+N as one piece of information, but it is impossible to know directly its construction, that is, that it is generated with k(A) and N. Likewise as for E(k(A)+k(B)+N,M), the monitor C can obtain E(k(A)+k(B)+N,M) as one piece of information, but cannot known its construction directly.

The set of terms S[1→3] to be verified from the subject A to the monitor C is:

$$S[1 \rightarrow 3] = \{M\}$$

The correlation with the typical Diffie-Hellman cipher communication procedure mentioned above is as follows:

the integer x selected by the subject A in an arbitrary manner corresponds to k(A)

the integer y selected by the subject B in an arbitrary manner corresponds to k(B)

X(X=$g^x$ mod n) corresponds to k(A)+N

Y(Y=$g^y$ mod n) corresponds to k(B)+N k(k=$Y^x$ mod n) corresponds to k(A)+(k(B)+N)

k'(k'=$X^y$ mod n) corresponds to k(B)+(k(A)+N)

In addition, k(A)+(k(B)+N)=k(B)+(k(A)+N) is derived from the equivalence k=k'. Herein, a+n is assumed to represent $g^a$ mod n.

An equational tree automaton is generated by inputting the cipher communication procedure P, set of function symbols F, rewriting rule {Ri}, knowledge {Ki}, axiom U, and set of terms S[1→3] to be verified described above from the input unit 5, as shown in FIG. 2. Calculation is automatically executed by using this automaton, and the safety of the cipher communication procedure is assessed. In case of this Example, as described above, confidential information is included in the set F as the function symbol M (constant function symbol) having no argument. Specifically, M is a term. Moreover, since the subject of verification is a finite set consisting of M only, as a result of determining in step 26, the process of step 27 is executed. Specifically, the safety of the cipher communication procedure is assessed by examining "whether or not M (confidential information) is included in A3* (equational tree automaton accepting a set of knowledge that can be finally owned by the monitor C)".

EXAMPLE 2

The case where the present invention is applied to the cipher communication procedure using one-time pad suggested by Shamir will be described.

The cipher communication procedure of the one-time pad is executed under encryption that satisfies the commutative law (E(k(A),E(k(B),M))=E(k(B),E(k(A),M))) in the following procedures (1)-(4):

(1) The subject A sends the E(k(A),M) obtained by encrypting confidential information M using the key k(A) to the subject B.

(2) The subject B sends the E(k(B),E(k(A),M)) obtained by encrypting the obtained E(k(A),M) using the key k(B) to the subject A.

(3) the subject A decrypts the obtained E(k(B),E(k(A),M)) using the key k(A), and sends the obtained D(k(A),E(k(B),E(k(A),M))) to the subject B.

(4) the subject B can obtain confidential information M by decrypting the obtained D(k(A),E(k(B),E(k(A),M))) using the key k(B). Specifically, considering the commutative law, D(k(B),D(k(A),E(k(B),E(k(A),M))))=D(k(B),D(k(A),E(k(A),E(k(B),M)) ))=D(k(B),E(k(B),M))=M.

As encryption/decryption that satisfies the commutative law, using a random number bit string having the same length as the plaintext to be encrypted as a key, the exclusive OR operation (hereinafter referred to as XOR) of this and plaintext is used.

In this case, provided that "+" represents XOR, the cipher communication procedure P, set of function symbols F, axiom U, and set of terms S[1→3] to be verified will have the same representations as in the above Example 1.

The rewriting rule {Ri} can be written as:

E(x,E(y,z))→E(x+y,z)

E(id,x)→x id+id→id (x+x)+y→Y id is a function introduced for the sake of convenience. The knowledge {Ki} is:

K1={A,B,k(A),id,M,E(k(B),E(k(A),M))}

K2={A,B,k(B),id,E(k(A),M),D(k(A),E(k(B), E(k(A), M)))}

K3={A,B,C,k(C),id,E(k(A),M),E(k(B),E(k(A),M)), D(k(A),E(k(B),E(k(A),M)))}

By inputting the cipher communication procedure P, a set of function symbols F, rewriting rule {Ri}, knowledge {Ki}, axiom U, and a set of terms S[1→3] to be verified described above from the input unit 5, as shown in FIG. 2, an equational tree automaton is generated. Calculation is automatically executed by using this automaton, and the safety of the cipher communication procedure is assessed. In this Example, as well as in Example 1, the confidential information is included in the set F as the function symbol M having no argument, whereby the process of step 27 is executed.

In Examples 1 and 2 above, when the target is infinite confidential information, an equational tree automaton S which accepts a set of confidential information previously determined is inputted, whereby safety verification is executed by the processes of steps 28-30.

In the foregoing, when the set of terms S[j→k] to be verified is a finite set, the process of step 27 is executed. In this case, S[j→k] can be described as an equational tree automaton and inputted preliminarily in step 20 so that the processes of steps 28-30 are executed.

In addition, in the foregoing, when the set of terms to be verified is an infinite set, S[j→k] described as an equational tree automaton in step 20 is inputted, but also in this case, the set of terms S[j→k] to be verified can be inputted so that an equational tree automaton which accepts this is generated by the translation unit 8.

Figure 5:
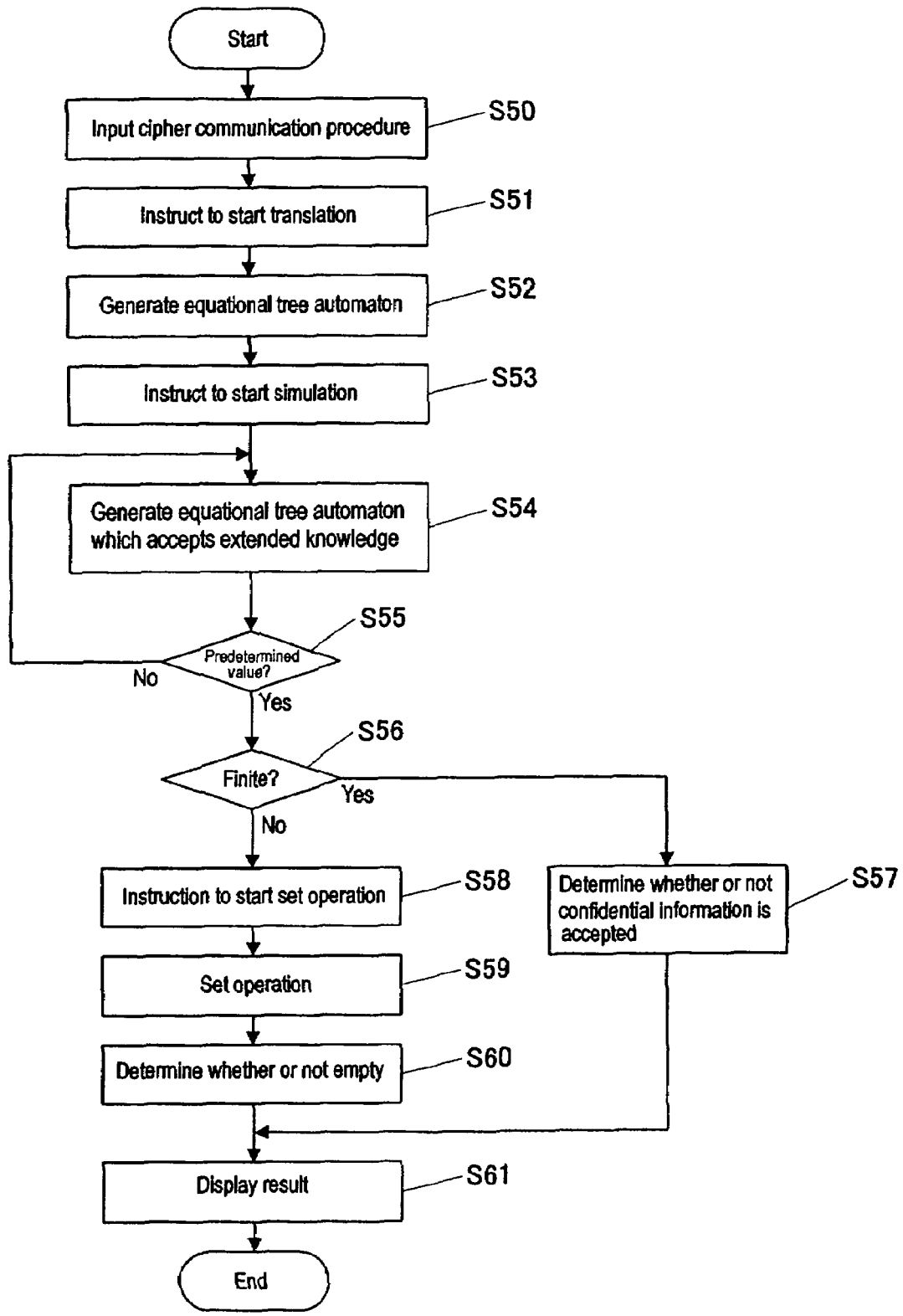
FIG. 5 is a flowchart showing the process of the case where the convergence of an equational tree automaton which accepts extended knowledge is not determined in a process performed by a safety verification device of a reactive system according to an embodiment of the present invention.

Moreover, in the foregoing, to enable strict safety verification, the processes in steps 26-30 are not executed when the process of step 24 in FIG. 2 does not converge, but it can also be modified, as shown in FIG. 5. In FIG. 5, the processes of steps 50-52 and 56-61 are the same as those of steps 20-22 and 26-31, respectively, in FIG. 2.

In step 53, the CPU 1 transmits an operation code to start simulation and the like to the simulation unit 9 as in step 23, and the simulation unit 9 sets an initial value, for example, "0", in a counter.

In step 54, as already described with regard to the process in step 24, the simulation unit 9 generates the equational tree automaton Ai*(n) which accepts extended knowledge Ki, and change the counter initial value set in step 53 by only 1, for example, increase by only 1, and then proceeds to step 55.

In step 55, the simulation unit 9 determines whether or not the value of the counter is that previously set (for example, natural number n0). If it is the set value (n0), it proceeds to step 56. If not, it returns to step 54. This allows execution of the process of step 54 only a predetermined number of times (n0). Correspondingly, the equational tree automaton Ai*(n0) which accepts extended knowledge Ki is generated.

In FIG. 5, without determining the convergence of the equational tree automaton Ai*(n) which accepts the extended knowledge Ki, the process of step 54 is performed for a predetermined times, and then the processes following step 56 are always executed. If it is determined to be safe as a result, the determination is not necessarily correct and may not be actually safe. However, if it is determined to be unsafe, the determination is correct. Therefore, the process shown in FIG. 5 is also an effective process in the safety verification of an cipher communication procedure.

In the foregoing, the safety verification of cipher communication procedures was described referring to embodiments and Examples, safety of other reactive systems can be also verified as well. For example, it is possible to verify the safety relating to procedures controlling systems such as nuclear reactors and aircrafts. Furthermore, system safety verification can be performed at early stages of designing, regardless of the scale of the system.

In this case, the process (step 22 in FIG. 2) of generating an equational tree automaton which accepts incipient knowledge by the translation unit 8 can be a process of generating an equational tree automaton that describes the subject reactive system. Alternatively, when an equational tree automaton describes the subject reactive system previously generated is inputted in step 20, the process in step 22 may be dispensed with.

Other processes are similar to the embodiments described above, for example, the safety verification of the reactive system is enabled by determining whether or not the finite states to be verified, i.e., the set of dangerous conditions S[j→k] is accepted by the equational tree automaton generated in step 24. When the set of states S[j→k] to be verified is an infinite set, the safety verification of the reactive system is enabled by determining whether or not empty as in the above embodiments using S[j→k] described as an equational tree automaton.

The safety verification device of a reactive system according to the present invention can generate an equational tree automaton relating to cipher communication procedures, which corresponds to a set of knowledge which is the largest obtainable one for the monitor of the communication, and allows to determine whether or not confidential information can be included in the set of knowledge of the monitor, in other words, verify the safety of the cipher communication procedure. In particular, safety of cipher communication procedures that do not satisfy the regular condition can be also verified not approximately but strictly.

Moreover, in the safety verification device of a reactive system according to the present invention, even in case where the convergence of an equational tree automaton corresponding to extended set of knowledge of a monitor is not determined, the unsafety of the cipher communication procedure can be correctly determined.

The safety verification device of a reactive system according to the present invention can generate an equational tree automaton representing the largest set of possible states for general reactive systems, and examine whether or not it can be in a state to be verified, i.e., verify the safety of a reactive system.

In a large-scale system, its safety can be verified at early stages of designing, and a loss can therefore be minimized even when modifications in design are unavoidable due to errors found by verification.

Moreover, in the safety verification device of a reactive system according to the present invention, for general reactive systems, even in case where the convergence of an equational tree automaton representing a set of extended states is not determined, the unsafety of the reactive system can be correctly determined.

INDUSTRIAL APPLICABILITY

According to the present invention, safety of cipher communication procedures used for services provided via public networks and dedicated networks in the industrial fields such as financial industry and electronic commerce can be verified. Moreover, safety of procedures for controlling other reactive systems, for example, nuclear reactors and aircrafts can be verified. Further, safety verification can be performed at early stages of system designing, regardless of the scale of the system.

The invention claimed is:

1. A safety verification device of an electronic reactive system which is a cipher communication system or control system for a nuclear reactor or aircraft, represented by a set of function symbols, a set of rewriting rules, a set of axioms, a set of first terms, and a set of second terms to be verified, said set of axioms being a set consisting only a commutative law and an associative law, and said safety verification device of a reactive system comprising a processing unit, a recording unit, a translation unit, a simulation unit and a set operation unit, wherein:

said set of function symbols, said set of rewriting rules, said set of axioms, said set of first terms, and said set of second terms to be verified are recorded in said recording unit;

said translation unit is controlled by said processing unit to read out said set of axioms and said set of first terms from said recording unit and to generate, under said set of axioms, a first equational tree automaton which accepts said set of first terms;

said simulation unit is controlled by said processing unit to read out said set of rewriting rules, said set of axioms and said set of first terms from said recording unit and to generate, under said set of rewriting rules and said set of axioms and using said first equational tree automaton as initial data, a second equational tree automaton which accepts said set of first terms and a set that comprises terms derived from said set of first terms;

said set operation unit is controlled by said processing unit to generate, using said second equational tree automaton and said set of second terms to be verified, a fourth equational tree automaton by associating said second equational tree automaton with a third equational tree automaton which accepts said set of second terms to be verified and to determine whether or not a set accepted by the fourth equational tree automaton is an empty set;

said second equational tree automaton is generated through first and second repetition processes;

wherein said first repetition process comprises:

(A) setting said first equational tree automaton to initial data;

(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;

(C) determining a set of third terms by rewriting all terms which are included in a fifth equational tree automaton obtained in a last process performed according to the rewriting rule $f(c^{p.1}_{tb}, \ldots,$ $c^{p.n}{}_{tm}) \text{-->} c^{p}{}_{l|p}$, wherein a function symbol of said element p is described as $f$, argument terms are described as $t_1, \ldots, t_n$, and a term $l|p$ corresponding to said element p is described as $f(t_1, \ldots, t_n)$;

(D) obtaining a sixth equational tree automaton by performing repeatedly said (B) selecting and (C) determining processes regarding all elements p positioned at the ends of said tree-structure of said first group; and wherein said second repetition process comprises:

(E) setting said sixth equational tree automaton to initial data;

(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;

(G) determining a set of fourth terms by rewriting all terms which are included in a seventh equational tree automaton obtained in a last process performed according to the rewriting rule $f(d^{q.1}{}_{t1}, \ldots, d^{q.n}{}_{tm}) \text{-->} d^{q}{}_{r|q}$, wherein a function symbol of said element q is described as $f$, argument terms are described $t_1, \ldots, t_n$, and a term $r|q$ corresponding to said element q is described as $f(t_1, \ldots, t_n)$; and (H) obtaining said second equational tree automaton by performing repeatedly said (F) selecting and (G) determining processes regarding all elements q positioned at the ends of said tree-structure of said second group.

2. A safety verification device of a reactive system according to claim 1, wherein said set of function symbols is a set comprising function symbols representing encryption, decryption and communication processing as elements, said set of rewriting rules is a set comprising as an element a rule representing that encrypted information is returned to plaintext by decryption, said second terms to be verified are confidential information, and said set of first terms is a set of knowledge of each of subjects that exchange confidential information, and a set of knowledge of a subject that monitors the information exchanged between said subjects.

3. A safety verification device of an electronic reactive system, which is a cipher communication system or control system for a nuclear reactor or aircraft, represented by a set of function symbols, a set of rewriting rules, a set of axioms, a set of first terms, and a second term to be verified, said set of axioms being a set consisting only a commutative law and an associative law, and said safety verification device of a reactive system comprising a processing unit, a recording unit, a translation unit, a simulation unit and a set operation unit, wherein;

said set of function symbols, said set of rewriting rules, said set of axioms, said set of first terms, and said second term to be verified are recorded in said recording unit;

said translation unit is controlled by said processing unit to read out said set of axioms and said set of first terms from said recording unit and to generate, under said set of axioms, a first equational tree automaton which accepts said set of first terms;

said simulation unit is controlled by said processing unit to read out said set of rewriting rules, said set of axioms and said set of first terms from said recording unit and to generate, under said set of rewriting rules and said set of axioms and using said first equational tree automaton as initial data, a second equational tree automaton which accepts said set of first terms and a set that comprises terms derived from said set of first terms;

said set operation unit is controlled by said processing unit to determine whether or not said second equational tree automaton accepts said second term to be verified;

said second equational tree automaton is generated through first and second repetition processes;

wherein said first repetition process comprises:

(A) setting said first equational tree automaton to initial data;

(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;

(C) determining a set of third terms by rewriting all terms which are included in a third equational tree automaton obtained in a last process performed according to the rewriting rule $f(c^{p.1}{}_{t1}, \ldots, c^{p.n}{}_{tm}) \text{-->} c^{p}{}_{l|p}$, wherein a function symbol of said element p is described as $f$, argument terms are described as $t_1, \ldots, t_n$, and a term $l|p$ corresponding to said element p is described as $f(t_1, \ldots, t_n)$;

(D) obtaining a fourth equational tree automaton by performing repeatedly said (B) selecting and (C) determining processes regarding all elements p positioned at the ends of said tree-structure of said first group; and wherein said second repetition process comprises:

(E) setting said fourth equational tree automaton to initial data;

(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;

(G) determining a set of fourth terms by rewriting all terms which are included in a fifth equational tree automaton obtained in a last process performed according to the rewriting rule $f(d^{q.1}{}_{t1}, \ldots, d^{q.n}{}_{tm}) \text{-->} d^{q}{}_{r|q}$, wherein a function symbol of said element q is described as $f$, argument terms are described as $t_1, \ldots, t_n$, and a term $r|q$ corresponding to said element q is described as $f(t_1, \ldots, t_n)$; and (H) obtaining said second equational tree automaton by performing repeatedly said (F) selecting and (G) determining processes regarding all elements q positioned at the ends of said tree-structure of said second group.

4. A safety verification device of a reactive system according to claim 3, wherein said set of function symbols is a set comprising function symbols representing encryption, decryption and communication processing as elements, said set of rewriting rules is a set comprising as an element a rule representing that encrypted information is returned to plaintext by decryption, said second term to be verified is confidential information, and said set of first terms is a set of knowledge of each of subjects that exchange confidential information, and a set of knowledge of a subject that monitors the information exchanged between said subjects.

5. A safety verification method of an electronic reactive system, which is a cipher communication system or control system for a nuclear reactor or aircraft, represented by a set of function symbols, a set of rewriting rules, a set of axioms, a set of first terms, and a set of second terms to be verified, said set of axioms being a set consisting only a commutative law and an associative law, said method being executed by a computer comprising a processing unit and a recording unit, and said method comprising:

a first step in which said processing unit reads out said set of axioms and said set of first terms from said recording unit and generates, under said set of axioms, a first equational tree automaton which accepts said set of first terms;

a second step in which said processing unit reads out said set of rewriting rules, said set of axioms and said set of first terms from said recording unit and generates, under said set of rewriting rules and said set of axioms and using said first equational tree automaton as initial data, a second equational tree automaton which accepts said set of first terms and a set that comprises terms derived from said set of first terms; and a third step in which said processing unit generates, using said second equational tree automaton and said set of second terms to be verified, a fourth equational tree automaton by associating said second equational tree automaton with a third equational tree automaton which accepts said set of second terms to be verified and said processing unit determines whether or not a set accepted by the fourth equational tree automaton is an empty set, wherein said second step comprises first and second repetition processes;

wherein said first repetition process comprises:
(A) setting said first equational tree automaton to initial data;
(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;
(C) determining a set of third terms by rewriting all terms which are included in a fifth equational tree automaton obtained in a last process performed according to the rewriting rule $f(c^{p.l}_{tl}, \ldots, c^{p.n}_{tm}) \to c^{p}_{l|p}$, wherein a function symbol of said element p is described as $f$, argument terms are described as $t_l, \ldots, t_n$, and a term l|p corresponding to said element p is described as $f(t_l, \ldots, t_n)$;
(D) obtaining a sixth equational tree automaton by performing repeatedly said (B) selecting and (C) determining processes regarding all elements p positioned at the ends of said tree-structure of said first group; and wherein said second repetition process comprises:
(E) setting said sixth equational tree automaton to initial data;
(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;
(G) determining a set of fourth terms by rewriting all terms which are included in a seventh equational tree automaton obtained in a last process performed according to the rewriting rule $f(d^{q.l}_{tl}, \ldots, d^{q.n}_{tm}) \to d^{q}_{r|q}$, wherein a function symbol of said element q is described as $f$, argument terms are described $t_l, \ldots, t_n$, and a term r|q corresponding to said element q is described as $f(t_l, \ldots, t_n)$; and
(H) obtaining said second equational tree automaton by performing repeatedly said (F) selecting and (G) determining processes regarding all elements q positioned at the ends of said tree-structure of said second group.

6. A safety verification method of a reactive system according to claim 5, wherein said set of function symbols is a set comprising function symbols representing encryption, decryption and communication processing as elements,
said set of rewriting rules is a set comprising as an element a rule representing that encrypted information is returned to plaintext by decryption,
said second terms to be verified are confidential information, and
said set of first terms is a set of knowledge of each of subjects that exchange confidential information, and a set of knowledge of a subject that monitors the information exchanged between said subjects.

7. A safety verification method of an electronic reactive system, which is a cipher communication system or control system for a nuclear reactor or aircraft, represented by a set of function symbols, a set of rewriting rules, a set of axioms, a set of first terms, and a second term to be verified, said set of axioms being a set consisting only a commutative law and an associative law, said method being executed by a computer comprising a processing unit and a recording unit, and said method comprising:

a first step in which said processing unit reads out said set of axioms and said set of first terms from said recording unit and generates-, under said set of axioms, a first equational tree automaton which accepts said set of first terms;

a second step in which said processing unit reads out said set of rewriting rules, said set of axioms and said set of first terms from said recording unit and generates, under said set of rewriting rules and said set of axioms and using said first equational tree automaton as initial data, a second equational tree automaton which accepts said set of first terms and a set that comprises terms derived from said set of first terms; and a third step in which said processing unit determines whether or not said second equational tree automaton accepts said second term to be verified, wherein said second step comprises first and second repetition processes;

wherein said first repetition process comprises:
(A) setting said first equational tree automaton to initial data;
(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;
(C) determining a set of third terms by rewriting all terms which are included in a third equational tree automaton obtained in a last process performed according to the rewriting rule $f(c^{p.l}_{tl}, \ldots,$ $c^{p,n}{}_{tn}) \mathrel{-}\mathrel{-}> c^{p}{}_{l|p}$, wherein a function symbol of said element p is described as $f$, argument terms are described as $t_l, \ldots, t_n$, and a term $l|p$ corresponding to said element p is described as $f(t_l, \ldots, t_n)$;

(D) obtaining a fourth equational tree automaton by performing repeatedly said (B) selecting and (C) determining processes regarding all elements p positioned at the ends of said tree-structure of said first group; and wherein said second repetition process comprises:

(E) setting said fourth equational tree automaton to initial data;

(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;

(G) determining a set of fourth terms by rewriting all terms which are included in a fifth equational tree automaton obtained in a last process performed according to the rewriting rule $f(d^{q,l}{}_{tl}, \ldots, d^{q,n}{}_{tn}) \mathrel{-}\mathrel{-}> d^{q}{}_{r|q}$, wherein a function symbol of said element q is described as $f$, argument terms are described as $t_l, \ldots, t_n$, and a term $r|q$ corresponding to said element q is described as $f(t_l, \ldots, t_n)$; and (H) obtaining said second equational tree automaton by performing repeatedly said (F) selecting and (G) determining processes regarding all elements q positioned at the ends of said tree-structure of said second group.

8. A safety verification method of a reactive system according to claim 7, wherein said set of function symbols is a set comprising function symbols representing encryption, decryption and communication processing as elements, said set of rewriting rules is a set comprising as an element a rule representing that encrypted information is returned to plaintext by decryption, said second term to be verified is confidential information, and said set of first terms is a set of knowledge of each of subjects that exchange confidential information, and a set of knowledge of a subject that monitors the information exchanged between said subjects.

9. A computer-readable recording medium containing a reactive system safety verification computer program, said reactive system being an electronic system, which is a cipher communication system or control system for a nuclear reactor or aircraft, said computer program being executed by a computer comprising a processing unit and a recording unit, and said computer program comprising:

a first program code which makes said processing unit to accept an input of a procedure represented by a set of function symbols, a set of rewriting rules, a set of axioms, a set of first terms, and a set of second terms to be verified and to record said procedure in said recording unit;

a second program code which makes said processing unit to read out said set of axioms and said set of first terms from said recording unit and to generate, under said set of axioms consisting only of a commutative law and an associative law, a first equational tree automaton which accepts said set of first terms;

a third program code which makes said processing unit to read out said set of rewriting rules, said set of axioms and said set of first terms from said recording unit and to generate, under said set of rewriting rules and said set of axioms and using said first equational tree automaton as initial data, a second equational tree automaton which accepts said set of first terms and a set that comprises terms derived from said set of first terms; and a fourth program code which makes said processing unit to generate, using said second equational tree automaton and said set of second terms to be verified, a fourth equational tree automaton by associating said second equational tree automaton with a third equational tree automaton which accepts said set of second terms to be verified and to determine whether or not a set accepted by the fourth equational tree automaton is an empty set, wherein said second program code makes said processing unit to execute first and second repetition processes;

wherein said first repetition process comprises:

(A) setting said first equational tree automaton to initial data;

(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;

(C) determining a set of third terms by rewriting all terms which are included in a fifth equational tree automaton obtained in a last process performed according to the rewriting rule $f(c^{p,l}{}_{tl}, \ldots, c^{p,n}{}_{tn}) \mathrel{-}\mathrel{-}> c^{p}{}_{l|p}$, wherein a function symbol of said element p is described as $f$, argument terms are described as $t_l, \ldots, t_n$, and a term $l|p$ corresponding to said element p is described as $f(t_l, \ldots, t_n)$;

(D) obtaining a sixth equational tree automaton by performing repeatedly said (B) selecting and (C) determining processes regarding all elements p positioned at the ends of said tree-structure of said first group; and wherein said second repetition process comprises:

(E) setting said sixth equational tree automaton to initial data;

(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;

(G) determining a set of fourth terms by rewriting all terms which are included in a seventh equational tree automaton obtained in a last process performed according to the rewriting rule $f(d^{q,l}{}_{tl}, \ldots, d^{q,n}{}_{tn}) \mathrel{-}\mathrel{-}> d^{q}{}_{r|q}$, wherein a function symbol of said element q is described as $f$, argument terms are described as $t_l, \ldots, t_n$, and a term $r|q$ corresponding to said element q is described as $f(t_l, \ldots, t_n)$; and (H) obtaining said second equational tree automaton by performing repeatedly said (F) selecting and (G) determining processes regarding all elements q positioned at the ends of said tree-structure of said second group.

10. A computer-readable recording medium containing a reactive system safety verification computer program according to claim 9, wherein said set of function symbols is a set comprising function symbols representing encryption, decryption and communication processing as elements, said set of rewriting rules is a set comprising as an element a rule representing that encrypted information is returned to plaintext by decryption, said second terms to be verified are confidential information, and said set of first terms is a set of knowledge of each of subjects that exchange confidential information, and a set of knowledge of a subject that monitors the information exchanged between said subjects.

11. A computer-readable recording medium containing a reactive system safety verification computer program, said reactive system being an electronic system, which is a cipher communication system or control system for a nuclear reactor or aircraft, said computer program being executed by a computer comprising a processing unit and a recording unit, and said computer program comprising:

a first program code which makes said processing unit to accept an input of a procedure represented by a set of function symbols, a set of rewriting rules, a set of axioms, a set of first terms, and a second term to be verified and to record said procedure in said recording unit;

a second program code which makes said processing unit to read out said set of axioms and said set of first terms from said recording unit and to generate, under said set of axioms consisting only of a commutative law and an associative law, a first equational tree automaton which accepts said set of first terms;

a third program code which makes said processing unit to read out said set of rewriting rules, said set of axioms and said set of first terms from said recording unit and to generate, under said set of rewriting rules and said set of axioms and using said first equational tree automaton as initial data, a second equational tree automaton which accepts said set of first terms and a set that comprises terms derived from said set of first terms; and a fourth program code which makes said processing unit to determine whether or not said second equational tree automaton accepts said second term to be verified, wherein said second program code makes said processing unit to execute first and second repetition processes;

wherein said first repetition process comprises:

(A) setting said first equational tree automaton to initial data;

(B) selecting an element p from a first group which consists of position information in a tree-structure when left sides of equations, each of said equations corresponding to a rewriting rule in said set of rewriting rules, are described in tree-structure, wherein said element p is positioned at the end of said tree-structure;

(C) determining a set of third terms by rewriting all terms which are included in a third equational tree automaton obtained in a last process performed according to the rewriting rule $f(c^{p.1}_{t_1}, \ldots, c^{p.n}_{t_m}) \rightarrow c^{p}_{l|p}$, wherein a function symbol of said element p is described as $f$, argument terms are described as $t_1, \ldots, t_n$, and a term $l|p$ corresponding to said element p is described as $f(t_1, \ldots, t_n)$;

(D) obtaining a fourth equational tree automaton by performing repeatedly said (B) selecting and (C) determining processes regarding all elements p positioned at the ends of said tree-structure of said first group; and wherein said second repetition process comprises:

(E) setting said fourth equational tree automaton to initial data;

(F) selecting an element q from a second group which consists of position information in a tree-structure when right sides of equations, each of said equations corresponding to a rewriting rule in said set of rewriting rules, are described in tree-structure, wherein said element q is positioned at the end of said tree-structure;

(G) determining a set of fourth terms by rewriting all terms which are included in a fifth equational tree automaton obtained in a last process performed according to the rewriting rule $f(d^{q.1}_{t_1}, \ldots, d^{q.n}_{t_m}) \rightarrow d^{q}_{r|q}$, wherein a function symbol of said element q is described as $f$, argument terms are described as $t_1, \ldots, t_n$, and a term $r|q$ corresponding to said element q is described as $f(t_1, \ldots, t_n)$; and (H) obtaining said second equational tree automaton by performing repeatedly said (F) selecting and (G) determining processes regarding all elements q positioned at the ends of said tree-structure of said second group.

12. A computer-readable recording medium containing a reactive system safety verification computer program according to claim 11, wherein said set of function symbols is a set comprising function symbols representing encryption, decryption and communication processing as elements, said set of rewriting rules is a set comprising as an element a rule representing that encrypted information is returned to plaintext by decryption, said second term to be verified is confidential information, and said set of first terms is a set of knowledge of each of subjects that exchange confidential information, and a set of knowledge of a subject that monitors the information exchanged between said subjects.

* * * * *

UNITED STATES PATENT AND TRADEMARK OFFICE
CERTIFICATE OF CORRECTION

| | |
|---|---|
| PATENT NO. | : 7,503,060 B2 |
| APPLICATION NO. | : 10/521671 |
| DATED | : March 10, 2009 |
| INVENTOR(S) | : Ohsaki et al. |

Page 1 of 1

It is certified that error appears in the above-identified patent and that said Letters Patent is hereby corrected as shown below:

On Title Page, Item (86), after "PCT No.: PCT/JP03/09155", please delete "09155" and insert --, 09153.--

Signed and Sealed this

Seventh Day of July, 2009

JOHN DOLL
*Acting Director of the United States Patent and Trademark Office*